Oct. 16, 1951
A. O. McCOUBREY
2,571,915
DIRECT CURRENT AMPLIFIER
Filed Sept. 9, 1949
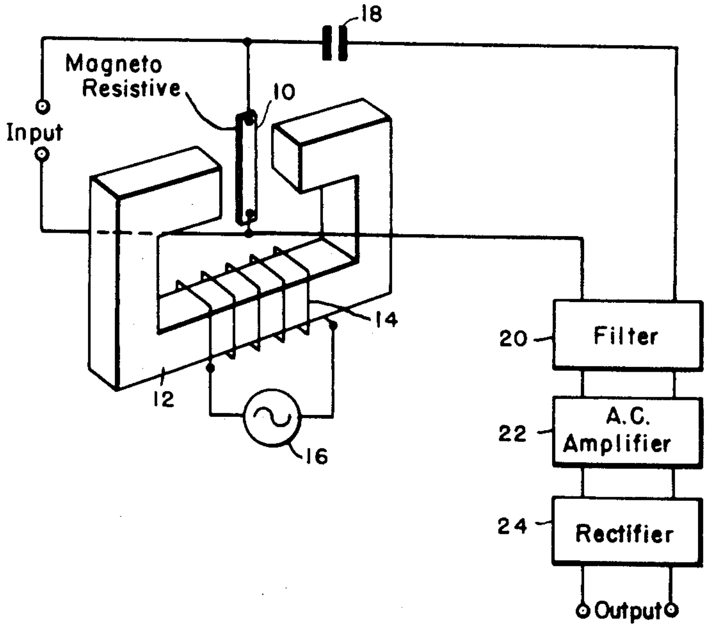
WITNESSES:
E. A. McCloskey.
Marcus W. Dodd
INVENTOR
Arthur O. McCoubrey.
BY
Hyman Diamond
ATTORNEY Patented Oct. 16, 1951

2,571,915

UNITED STATES PATENT OFFICE 2,571,915

DIRECT-CURRENT AMPLIFIER

Arthur O. McCoubrey, Forest Hills, Pa., assignor to Westinghouse Electric Corporation, East Pittsburgh, Pa., a corporation of Pennsylvania Application September 9, 1949, Serial No. 114,748

6 Claims. (Cl. 332—51)

This invention relates to the amplification of direct or slowly varying currents, and more particularly, to an amplifier wherein the variations in the electrical resistivity of a conductor due to the variations in a surrounding magnetic field are used to modulate the input for subsequent amplification and rectification in a conventional A. C. amplifier-rectifier arrangement.

It is an object of my invention to provide a D. C. amplifier which makes use of high-gain A. C. amplifiers and which avoids the limitations introduced by the use of mechanically moving parts, choppers, thermionic emitting devices and evacuated tubes.

A further object is to provide a D. C. amplifier whose stability is not impaired by slow drifts in supply potentials.

Another object is to provide a D. C. amplifier which utilizes a magnetoresistive control element, a frequency-selective network, a high-gain A. C. amplifier and a rectifier, said frequency-selective network being arranged to accept the magnetoresistive voltage component of the output of said control element, while rejecting the inductive voltage component.

Still another object is to provide an amplifier wherein the control element is of the magnetoresistive type, said control element being electrically connected to both input and output circuits.

These and other objects of the invention will be apparent from the following description, taken in connection with the appended drawing, whose single figure is a partially schematic diagram of a preferred form of the invention.

Prior art attempts to provide amplifiers suitable for use with direct or slowly varying potentials have been in general of three different types; in the first type, the direct current whose magnitude (or variations therein) is to be amplified is utilized to control the position of an optical or mechanical lever, so arranged that the significant indication is taken off at a point whose motion bears a ratio greater than unity to the motion of the input point. In this case, the amplification is strictly geometrical, and of course the arrangements have the great disadvantage that their speed of response is limited by the necessity for moving one or several mechanical parts. Even in the case of a light-weight mirror, as used in the optical type of amplifier, this limitation can be very undesirable.

A second type of direct current amplifier which has been proposed and used has consisted of a device for converting the direct current or potential to be amplified into an alternating current or potential, for example by the use of a rotating commutator, vibrator or the like which operates to "chop" the direct current at a relatively high rate, thus providing in effect an alternating or pulsating current whose amplitude is modulated by the direct current variations to be amplified. This modulated alternating or pulsating current is then fed into a conventional A. C. amplifier which in turn feeds a rectifier or demodulator to provide a direct current output which is proportional to the input signal. Such devices are difficult and expensive to manufacture, and are subject to errors due to the existence of unavoidable contact resistances and contact potentials.

A third type of direct current amplifier that has been proposed and used employs conventional vacuum tube amplifiers in the direct current coupling between stages. In this arrangement, small variations in power supply current can cause objectionable variations in the amplifier output. Changes in operating characteristics of the amplifier components are also objectionable.

The present invention falls into the general category of the second type referred to above, and in addition provides an amplifier suitable for the amplification of direct or slowly varying potentials without the use of any mechanically moving parts or contacts, and which will permit taking advantage of the high gain and stability features of conventional A. C. amplifiers without the concomitant objections heretofore associated with amplifiers of the chopper type referred to above. To this end, the present invention utilizes a control element which is formed of a material whose resistivity varies with the strength of an applied magnetic field, the current to be amplified being applied across such control element to develop a potential drop whose magnitude is determined by both the strength of the current to be amplified, and the strength of the applied magnetic field. Such control element is located within the field of an electromagnet having an exciting winding which is fed by any convenient source of alternating frequency (preferably having a frequency value which is large compared to the fastest variations to be amplified), so that the potential drop across the control element is caused to vary in accordance with the applied direct current potential, in the manner defined by Ohm's law, and also said potential drop is simultaneously caused to vary about some median value by reason of the rapid variation in resistivity of the material forming the control element when the alternating or rapidly varying magnetic field is applied thereto. The net voltage drop across the control element, therefore, will in effect constitute a rapidly pulsating potential upon which is superimposed the direct current or slowly varying potential to be amplified. The composite voltage thus obtained can readily be amplified in any conventional A. C. amplifier, and the amplified output can be rectified to produce a direct current output which is an accurately amplified function of the direct current or potential applied to the control element.

Any suitable material may be used for the control element, so long as it has the property of varying its resistivity under the influence of an applied magnetic field. Materials such as bismuth and platinum are convenient for this purpose, and are preferred, but it is to be understood that any material having the above described property, and generally known as "magnetoresistive" materials may be employed.

Referring now more particularly to the drawing, there is illustrated a control element or resistance 10 formed of the magnetoresistive material, and located between the pole pieces of an electromagnet 12 having an exciting winding 14 connected to any suitable source 16 of alternating current; ordinary 60 cycle main current is adaptable for this purpose, although other convenient sources are usable as well.

Connected in series with the control element 10 are a D. C.-blocking condenser 18 and a high-pass frequency-selective network 20 whose output is connected to the input terminals of the A. C. amplifier 22. The output terminals of the A. C. amplifier 22 are connected to the input terminals of a rectifier 24, at whose output terminals appears the final amplified D. C. signal. The frequency $f_1$ of the A. C. source or generator 16 is preferably such that its second harmonic is a frequency suitable for amplification in the A. C. amplifier 22, and the components of the frequency-selective network 20 are of such magnitude that the pass-band of the network includes the second harmonic of frequency $f_1$ but not the fundamental.

The operation of my invention is as follows: the signal to be amplified is passed through the magnetoresistive element 10, giving rise to a potential difference thereacross whose magnitude is directly dependent, in accordance with Ohm's law, upon the magnitude of the current passing therethrough. Concurrently, the A. C. generator 16 excites the field winding 14 of the electromagnet 12, giving rise to an alternating magnetic field between the pole pieces of said electromagnet. Since the magnetoresistive control element 10 is disposed between the pole pieces of the electromagnet 12, its electrical resistivity is also a function of the strength of the alternating magnetic field. If the magnetoresistive material is bismuth or platinum, the presence of a magnetic field always causes an increase in electrical resistivity regardless of the polarity of such field. Thus the alternating component of resistance and, hence, the alternating component of potential difference will have a frequency twice that of the alternating magnetic field produced by source 16. The frequency-selective network 20 accepts the higher frequency, which results from magnetoresistive action, and rejects the lower frequency, which results from transformer action from the exciting winding 16 to the element 10 in inductive relation thereto. In this manner, the voltage component introduced by transformer action is eliminated, and the output of the device is a function solely of the magnetoresistive action.

The output of the frequency-selective network 20 is amplified by a conventional high-gain A. C. amplifier 22 and then rectified by any desired or conventional rectifier 24, appearing at the output terminals of the latter as the final amplified D. C. signal.

I am aware that it has heretofore been proposed to utilize a magnetoresistive element in the magnetic field of an electromagnet as a repeater or amplifier of alternating currents, for example by utilizing the energy to be amplified as the exciting current for the electromagnet, but all such proposals have been severely limited by reason of the very weak magnetic fields which it is possible to produce from input energy sources of the magnitudes generally requiring amplification. In the present invention, the current utilized to produce the varying magnetic field is not the current to be amplified, and hence can be made as large as is necessary to obtain a desirable value of flux density between the poles of the magnet. Moreover, by appropriate design of the magnetoresistive element of the present invention, a wide choice may be exercised as to the impedance which is presented to the input source or circuit.

The ultimate sensitivity of a D. C. amplifier in accordance with the teaching of the present invention is limited by the sensitivity of the A. C. amplifier 22 used to amplify the alternating component of potential drop across the control element 10, and by the magnitude of the magnetoresistive effect. The sensitivity of the A. C. amplifier, in turn, is limited by the usual noise considerations, and is an inverse function of the band width of signals which must be amplified, and of the input resistance value. In the case where speed of response of the D. C. amplifier is unimportant, the band width of the A. C. amplifier must only be sufficient to allow for possible variations in the frequency of the magnetic field. The magnetoresistive effect for bismuth is such that with magnetic field strengths of the order of 15,000 gauss, the total resistance can be increased by about 80% of the normal value. Such magnetic field strengths can readily be obtained with practical sizes of magnets weighing only a few pounds. Higher field strengths would of course produce still higher ratios of magnetized resistance to normal resistance.

The stability of D. C. amplifiers in accordance with this invention is clearly not dependent upon the absence of long-time drifts in supply potentials, and is free from the deleterious effects introduced by electrical contacts and contact potentials which might also be subject to variations with time. The stability of the present amplifier is limited principally by the stability of the vacuum tubes and other components and circuits utilized in the construction of the A. C. amplifier used therein. Proper circuit design can provide higher stability and amplification relatively independent of the stability of the vacuum tubes and supply potentials.

While the invention has been disclosed herein in connection with a preferred embodiment which has proved very satisfactory in actual tests, it is to be understood that the description and drawing are for purposes of disclosure, and that the details thereof may be varied widely without departing from the scope of the invention as defined in the appended claims.

I claim as my invention:

1. An electrical amplifier comprising a control element formed of magnetoresistive material, means for connecting a signal to be amplified across said element, means for subjecting said element to an alternating magnetic field, and means directly responsive to the potential drop of said signal across said element.

2. An electrical amplifier comprising a resistance element formed of material whose resistivity varies in accordance with the strength of an applied magnetic field, means for applying a fluctuating magnetic field to said resistance element, means for applying a signal to be amplified across said element, and means directly responsive to the potential drop of said signal across said element.

3. A D. C. amplifier comprising an electromagnet having an energizing coil, a magnetoresistive element arranged in the magnetic field space of said electromagnet, input terminals connected across said element, means directly responsive to the potential drop across said element between said input terminals, and means for supplying a flustuating current to the energizing coil of said electromagnet.

4. A D. C. amplifier comprising means for generating a fluctuating magnetic field of substantially constant frequency, a magnetoresistive control element disposed within the magnetic field, an input circuit connected across said element, an output circuit including said element, and a blocking capacitor connected to said input circuit so as to be directly responsive to the potential drop in said input circuit across said element.

5. A D. C. amplifier comprising a resistance element whose resistivity varies with the magnitude of an applied magnetic field, means for subjecting said element to a magnetic field whose frequency is substantially constant, means for applying a signal to be amplified across said element, and means for measuring the voltage drop of said signal across said element.

6. An electrical amplifier comprising a resistance element, the resistivity of which varies with the magnitude of an applied magnetic field, means for subjecting said element to a magnetic field the frequency of which is substantially constant, means for applying a signal to be amplified across said element, an output circuit connected to said element, said output circuit comprising a blocking condenser.

ARTHUR O. McCOUBREY.

REFERENCES CITED

The following references are of record in the file of this patent:

UNITED STATES PATENTS

| Number | Name | Date |
|---|---|---|
| 1,550,660 | Affel | Aug. 25, 1925 |
| 2,297,543 | Eberhardt | Sept. 29, 1942 |
| 2,464,807 | Hansen | Mar. 22, 1949 |